United States Patent
Isokangas et al.

(10) Patent No.: US 7,180,883 B2
(45) Date of Patent: Feb. 20, 2007

(54) TRANSMISSION METHOD FOR PACKET DATA AND A NETWORK ELEMENT

(75) Inventors: Jari Isokangas, Tampere (FI); Sinikka Sarkkinen, Tampere (FI); Jukka Virtanen, Lempäälä (FI)

(73) Assignee: Nokia Corporation, Espoo (FI)

( * ) Notice: Subject to any disclaimer, the term of this patent is extended or adjusted under 35 U.S.C. 154(b) by 987 days.

(21) Appl. No.: 10/049,894

(22) PCT Filed: Jun. 25, 2001

(86) PCT No.: PCT/FI01/00599

§ 371 (c)(1),
(2), (4) Date: May 8, 2002

(87) PCT Pub. No.: WO02/01818

PCT Pub. Date: Jan. 3, 2002

(65) Prior Publication Data

US 2002/0196798 A1    Dec. 26, 2002

(30) Foreign Application Priority Data

Jun. 26, 2000    (FI) .................................. 20001509

(51) Int. Cl.
  *H04Q 7/24*    (2006.01)
  *H04L 12/28*   (2006.01)
  *H04L 12/56*   (2006.01)
(52) U.S. Cl. ........................ 370/338; 370/410; 370/412
(58) Field of Classification Search ................ 370/411,
370/389, 395, 395.1, 395.42, 474, 390, 241,
370/412, 392, 401, 395.31, 395.3; 709/237,
709/250, 224, 245, 238, 236, 203, 223, 246,
709/232, 230, 321, 463, 251, 253, 327, 243,
709/228, 202; 710/10, 11, 105
See application file for complete search history.

(56) References Cited

U.S. PATENT DOCUMENTS 6,247,060 B1 *  6/2001  Boucher et al. ............ 709/238

(Continued)

FOREIGN PATENT DOCUMENTS

EP        0777396 A1     6/1997

(Continued)

*Primary Examiner*—Huy D. Vu
*Assistant Examiner*—Daniel Ryman
(74) *Attorney, Agent, or Firm*—Cohen Pontani Lieberman & Pavane LLP

(57) ABSTRACT

In packet data transmission method, a packet data connection is indicated with a connection identifier and the destination of the packet data connection is indicated with a destination identifier. A destination identifier is involved in the initialization of a transmission queue, at least one connection identifier is related to each transmission queue, and a set of proper connection identifiers is the union of the connection identifiers related to the initialized transmission queues. A data packet having a proper connection identifier is placed (504, 505) to the corresponding transmission queue. The method is characterized in that the initialization of a new transmission queue is triggered (506, 508) by a data packet not having a proper connection identifier and having a destination identifier and after a successful initialization of a new transmission queue the data packet that triggered the initialization is placed (509) to the new transmission queue. The method can be employed, for example, in a network element (800).

14 Claims, 6 Drawing Sheets

U.S. PATENT DOCUMENTS 6,363,411 B1 * 3/2002 Dugan et al. ............... 709/202
6,434,620 B1 * 8/2002 Boucher et al. ............ 709/230
6,470,397 B1 * 10/2002 Shah et al. ................ 709/250

FOREIGN PATENT DOCUMENTS

| EP | 1 058 471 A2 | 12/2000 |
| WO | WO 94/07316 A1 | 3/1994 |
| WO | WO 97/36405 A1 | 10/1997 |
| WO | WO 9736405 A1 * | 10/1997 |
| WO | WO 99/05828 A1 | 2/1999 |
| WO | WO 99/20071 | 4/1999 |

* cited by examiner

TRANSMISSION METHOD FOR PACKET DATA AND A NETWORK ELEMENT

PRIORITY CLAIM

This is a national stage of PCT application No. PCT/FI01/00599, filed on 25 June 2001. Priority is claimed on patent application Ser. No. 20001509 filed in Finland on 26 June 2000.

FIELD OF THE INVENTION

The invention relates in general to packet data connections in cellular networks. In particular the invention relates to reserving resources for the packet data connections.

BACKGROUND OF THE INVENTION

Traditionally cellular networks have been circuit switched networks, i.e. a certain part of the data transmission capacity both at the fixed network and in the radio access network is reserved for each call. This capacity is reserved during the whole call, even if no speech or other data is transmitted.

The popularity of applications that can be run conveniently over packet switched networks, applications such as electronic mail and browsing the World Wide Web, has caused need to enhance current cellular networks to support packet switched connections. For example, in Global System for Mobile communication (GSM) packet switched connections are provided by General Packet Radio Service (GPRS). Existing GSM networks can be updated to carry packet data by adding proper network elements. With GPRS it should be possible, for example, use the radio resources in the radio access network more economically than by transmitting packet data in a circuit switched connection, i.e. in a data call, as can be done in GSM.

Universal Mobile Communication System (UNITS) is one of the future cellular networks that offer larger data transmission capacity than current cellular networks. UMTS supports packet switched connections, and same GPRS equipment as in GSM networks may be used there. In fact, GSM radio access networks and UMTS radio access networks may be connected to a common GPRS core network.

FIG. 1 presents a schematic diagram of an exemplary GSM radio access network and GPRS core network. A mobile station (MS) 101 communicates with a base station (BTS) 102. One or more base stations are connected to a base station controller (BSC) 103 that is responsible, for example, for allocation of radio resources and for handling handovers, where a mobile station changes the base station it communicates with. The base stations and base station controllers form the GSM radio access network. In addition to these components, a GSM network comprises Mobile Service Switching centers (MSC), Home Location Register (BLR) and Visitor Location Register (VLR). ELR and VLR take part in, for example, subscriber and mobility management.

The GPRS core network comprises GPRS supporting nodes (GSN). Of these nodes, the one which is on the edge towards a public data network, for example the Internet, is called Gateway GPRS supporting node (GGSN). In FIG. 1, a GGSN 105 is presented. Data packets may run through many GSNs, which act as routers. A mobile station, which is the endpoint of the data connection, is reachable through one base station controller and the GSN connected to this base station controller is called Serving GPRS support node (SGSN). In FIG. 1, the mobile station 101 is reachable via the BSC 103 and the GSN connected to this BSC is SGSN 104.

User data is transferred transparently between the MS and the external data networks with a method known as encapsulation and tunneling: data packets are equipped with GPRS-specific protocol information and transferred between the MS and GGSN. In order to access the GPRS services, a MS first makes its presence known to the network by performing a GPRS attach. This operation establishes a logical link between the MS and the SGSN, and makes the MS available for, for example, paging via SGSN and notification of incoming GPRS data.

The SGSN is at the same hierarchical level as the MSC, keeps track of the individual MSs' location and performs security functions and access control. The Gateway GSN provides interworking with external packet-switched networks, and is connected with SGSNs via an IP-based GPRS backbone network.

FIG. 1 presents also exemplary protocol stacks that may be used in each network element for transmitting packet data. The GGSN 105 has protocol stack 115. The physical layer and the medium access layer are not specified and they are represented with symbols L1 and L2 in FIG. 1. The protocol on the medium access layer protocol is Internet Protocol (IP), and on IP both User Datagram Protocol (UDP) and Transfer Control Protocol (TCP) may be run. In GPRS core network, data is transmitted using GPRS Tunneling Protocol (GTP). Data that is carried in the GTP packets is either IP packets or X.25 packets, as specified by the upmost layer in the protocol stack 115.

Towards the GGSN the protocol stack 114 of the SGSN is similar to that of the GGSN. It lacks the upmost layer of the GGSN protocol stack because the data transmission protocol in GPRS core network is GTP. A base station controller and the base station connected to it form a base station system (BSS). The protocol stack 112 of a BSS is presented in FIG. 1, too. Towards a BSS the SGSN has a different protocol stack than towards to GGSN. The common physical layer of the SGSN and BSS is L1bis, and Frame relay is used in the second protocol layer. The upmost protocol layer between the SSGN and the BSS is Base Station System GPRS protocol (BSSGP). Over this protocol the SGSN still has Logical Link Control (LLC) and Sub-network Dependent Convergence Protocol (SNDCP). LLC and SNDCP connections are between the SGSN and a mobile station. The interface between a BSS and a SGSN is called Gb interface.

The base station system, or more precisely a base station, communicates with a mobile station using GSM RF as the physical layer. On this protocol there are Medium Access Control and Radio Link Control protocols. The base station system relays the data and signaling information between the RLC and BSSGP. The protocol stack 111 of a mobile station comprises LLC and SNDCP protocols on top of RLC protocol. On these protocols there is a packet data protocol which is common with the GGSN. The application is the upmost layer in the protocol stack.

The protocol stacks in FIG. 1 are those related to data transmission. Signaling, which relates, for example, to mobility management and resource reservation is carried out using GSM Mobility Management and Session Management (GMM/SM) protocol in the place of SNDCP. Otherwise the signaling protocol stacks are similar to the data transmission protocol stacks presented in FIG. 1.

In third generation future cellular networks, the base station subsystem comprises a controller, which in UMTS is called a radio network controller (RNC) and base stations connected to the RNC. The base stations are here referred to as third generation base stations (3G-BTS) in order to distinct them from the base stations of a GSM radio access network for example. FIG. 2 presents as an example of a third generation cellular network an UMTS radio access network. The mobile station 201 that is compatible with the UMTS network is different from a GSM mobile station 101. It communicates with a 3G-BTS 202 that is connected to a RNC 203. The RNC may be connected to a GPRS core network. This is in FIG. 2 marked by presenting the RNC connected to a GPRS supporting node 104.

FIG. 2 presents also the exemplary protocol stack 212 of the UMTS base station system. The protocol stack 212 is related to packet data. Towards a GPRS supporting node, the lowest protocol layer is the same as that in the protocol stack 112 of the GSM base station system, but the upper layers in these protocol stacks are different. In UMTS base station system, Asynchronous Transfer Mode (ATM) is used in the medium access layer and GPRS tunneling protocol is the upmost protocol.

Because the protocol stacks in the UMTS base station system and in a GPRS supporting node are different, there is need for an interworking unit. In FIG. 2, the interworking unit (IWU) 206 is presented as a separate device, but it may be a part of the RNC or the SGSN as well. Towards the UMTS radio access network the protocol stack 216 of the interworking unit is similar to that of the UMTS base station system, and towards the GPRS core network it is similar to the protocol stack which in an SGSN faces a radio access network. The protocol stack 216 has only three layers, and the upmost data transmission protocols are BSSGP and GTP. The interworking unit relays the BSSGP data packets further as GTP data packets and vice versa.

Signalling related to, for example, radio resource reservation and mobility management, is carried out using a Radio Access Network Application Part (RANAP). In signaling protocol stack, the RANAP replaces the GRPS tunneling protocol in the protocol stack 212 of the UTMS base station system and in the protocol stack 216 of the interworking unit.

FIG. 3 presents a schematic drawing of a network, where a GSM radio access network 300 and an UMTS radio access network 310 are connected to a GPRS core network 320. In FIG. 3, the GSM radio access network 300 comprises two base stations 102*a* and 102*b*, and a base station controller 103. The UMTS radio access network 310 comprises two 3G base stations 202*a* and 202*b*, and a radio access network controller 203. The GSM radio access network 300 is connected to the GPRS core network 320 by connecting the BSC 103 to a SGSN 104 of the GPRS core network 320. The UMTS radio access network 310 is connected to the GPRS core network 320 by connecting the RNC 203 to the same SGSN 104. The GPRS core network 320 is connected to a public data network 330 using a GGSN 105.

In the GPRS core network 320 between the SGSN and GGSN a data stream related to a certain connection is identified usually with a certain connection identifier, for example with a flow label. Each GTP packet carrying data related to, for example, a certain IP connection, has the same identifier.

In the GPRS core network, there are subscriber-specific or connection-specific queues for the data packets. For each subscriber there may be many GTP sessions, each of which has a unique identifier, for example the GTP flow label. In the GSM radio access network, the data packet queues are cell-specific, so that the management of the queues is easy in the BSC. Depending on the number of service classes, there may be many packet queues in a specific cell. In a SGSN, the BSSGP layer is responsible for re-organizing the subscriber-specific data packet queues to cell-specific queues. This re-organizing requires information on the subscriber identifier to which a certain GTP flow label relates and on the cell in which the subscriber is. The correspondence between a GTP flow label or other connection identifier and a subscriber identity may be determined, for example, in the process of radio access network resource reservations when a Packet Data Protocol (PDP) context is being set up.

In UMTS radio access network, the RNC expects the packets arriving from the GPRS core network to be organized in subscriber-specific queues. Therefore between the Gb and Iu interterfaces, for example in the IWU, the cell-specific data packet queues have to be re-organized to subscriber-specific queues. An example is presented in FIG. 4, which shows the BSSGP layer 400 and GTP layer 410 of an IWU 206. These layers are involved in transmission of user data, signaling data is transmitted using the BSSGP and the RANAP.

The cell-specific data packet queues 411–414 are shown in the BSSGP layer 400. In FIG. 4, the BSSGP layer comprises a switching entity 440, which is responsible for organizing the data packets to connection-specific queues 421–422. As an example, data packets 401–403 are shown to be heading to a certain cell in the UMTS radio access network 310. The data packets belong to different packet data connections, and therefore they are placed to separate transmission queues 421, 423 and 424. In FIG. 4, the switch management entity 441 comprises information about connections A, B, C and D. For these connections a PDP context has been established between a mobile station within the UPTS radio access network 310 and a GGSN. The information may be received, for example, from a subscriber database in a SGSN. In FIG. 4, a subscriber database 450 is presented and arrow 431 shows how the necessary information in the database is signaled to the switch management entity.

The problem is that in certain situations a SGSN may transmit packets towards a UMTS radio access network without checking if the receiver mobile station has successfully carried out resource reservation in the UMTS radio access network and has established a PDP context. In a handover from a GSM radio access network to an UMTS radio access network it may happen that the SGSN receives information from the GSM radio access network that a handover has been completed, but the UMTS radio access network has not yet reserved resources for the GPRS data related to this mobile station. The SGSN may direct downlink data at once to the UMTS radio access network, but in the IWU, or corresponding functionality incorporated to the RNC or SGSN, for example, there is no information about the PDP context. The IWU, for example, does not have a proper transmission queue where to place the data packets with a certain GTP flow label. It has to discard the data packets. Other packets heading to other mobile stations within the UMTS radio access network may suffer from additional delays due to the time consumed by the processing of the data packet without a proper PDP context. Further, if some data packets are deleted without informing the SGSN, it may send the packets again without realizing that the problem is actually the lack of reservations or an unestablished PDP context in the UMTS radio access network.

SUMMARY OF THE INVENTION

The object of the invention is to present a method for transmitting data packets reliably. A further object is to present a method for transmitting data packets when proper transmission resources have not been reserved for the data packets before-hands.

The object of the invention is achieved by triggering resource reservation on the arrival of unswitchable packets that comprise a proper identifier for carrying out the resource reservation.

A method according to the invention is a method for transmitting data packets, where
- a packet data connection is indicated with a connection identifier and the destination of the packet data connection is indicated with a destination identifier,
- data packets are sorted into initialized transmission queues before transmission,
- a destination identifier is involved in the initialization of a transmission queue,
- at least one connection identifier is related to each transmission queue,
- a set of proper connection identifiers is the union of the connection identifiers related to the initialized transmission queues and
- a data packet having a proper connection identifier is placed to the transmission queue determined by the connection identifier, and it is characterized in that the initialization of a new transmission queue is triggered by a data packet not having a proper connection identifier and having a destination identifier and
- after a successful initialization of a new transmission queue the data packet that triggered the initialization is placed to the new transmission queue.

A network element according to the invention comprises
- means for storing data packet to transmission queues,
- means for indicating the connections related to each transmission queue with connection identifiers,
- means for detecting a connection identifier in a data packet, and
- means for placing a data packet to an initialized transmission queue whose connection identifier is equal to the connection identifier in the data packet, and it is characterized in that it further comprises means for triggering the initialization of a new transmission queue on the arrival of a data packet not having a connection identifier equal to any of the connection identifiers of the transmission queues and having a destination identifier.

The appended dependent claims describe some preferred embodiments of the invention.

In a method according to the invention data packets, which are being transmitted from one place to another, are sorted to transmission queues at some point of the connection. To each transmission queue packets related to a certain connection or to certain connections are placed. From the queues the packets may be transmitted further according to some specified priority rules, for example.

A transmission queue is initialized before packets are placed to the queue. This initialization typically involves some transmission resource reservations. Information about the destination of a connection is therefore needed, when a transmission queue is initialized. The destination identifier may be, for example, a network address of the destination or a name of the destination. A connection identifier can be associated to a certain transmission queue in the initialization or at a later stage. The invention does not specify, for example, a protocol using which the connection identifier is related to a transmission queue. The connection identifier may be, for example, a flow label of a certain packet data protocol. In a method according to the invention, transmission queues may be initialized dynamically. The establishment of a packet data connection involves the initialization of a transmission queue related to the connection.

Data packets having a connection identifier, which is equal to one of the queue identifiers of the initialized transmission queues, are placed to the queue having the same identifier. If a data packet comprises no connection identifier or if the connection identifier it comprises is not equal to any of the connection identifiers of the transmission queues, then there is no transmission queue where to place the data packet. In this case, it is checked if the data packet comprises a destination identifier, using which a new transmission queue can be initialized. If it comprises a destination identifier, the initialization of a new queue is triggered, i.e. resource reservations may be carried out. If there is not a destination identifier in the data packet, then the packet may be discarded.

The advantage of a method according to the invention is that if there is a situation where a connection has not been properly set up and there is no transmission queue related to a certain connection identifier, data packets having that connection identifier can be transmitted further without an extensive delay or without the sender re-sending it. If, for example, a mobile station has performed a handover and data packets related to a certain packet data connection are sent to the new location before information about the packet data connection is signaled to the radio access network, the arrival of a data packet heading to the mobile station triggers the signaling necessary for establishing the packet data connection.

Future, if the initialization of the transmission queue is not successful, then the sender of the data packet may be informed not to send data packets related to this certain connection.

The incoming data packets may be, for example, sorted to queues based on a different label or they may be unsorted. The invention does not specify in which order the incoming data packets are processed.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

DETAILED DESCRIPTION OF THE PRESENTLY PREFERRED EMBODIMENTS

Figure 1:
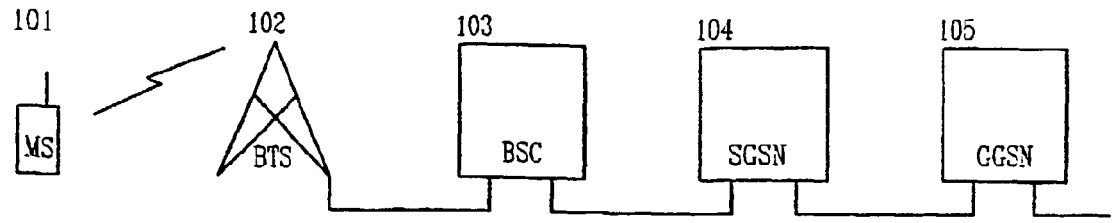
FIG. 1 shows a schematic drawing of a second generation radio access network and core packet network.
Figure 1:
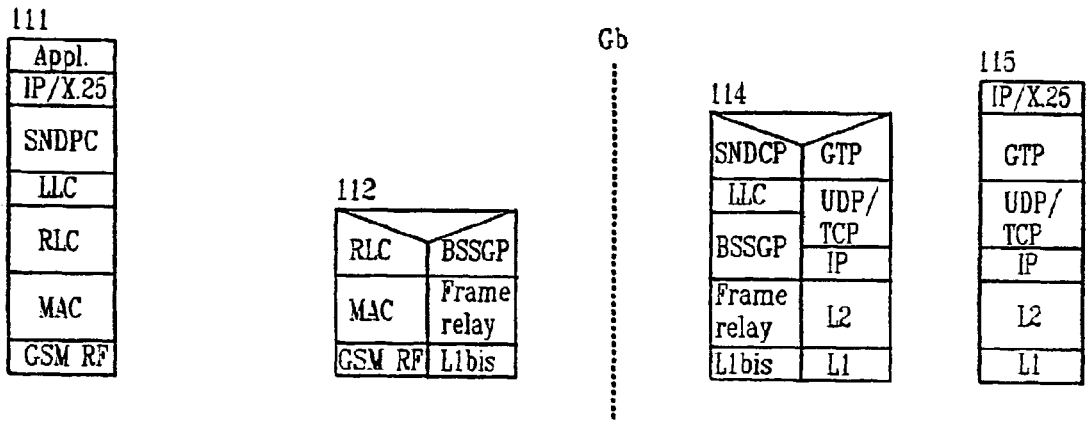
Figure 2:
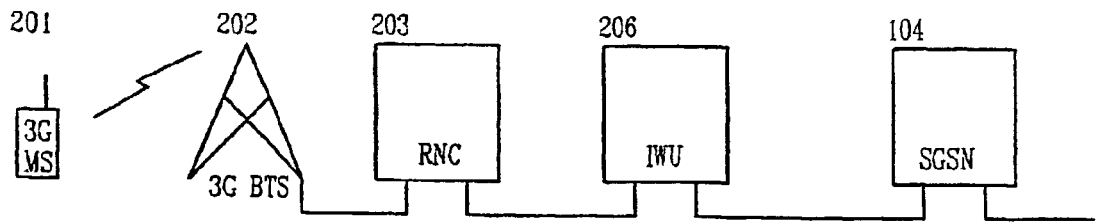
FIG. 2 shows a schematic drawing of a third generation radio access network and core packet network.
Figure 2:
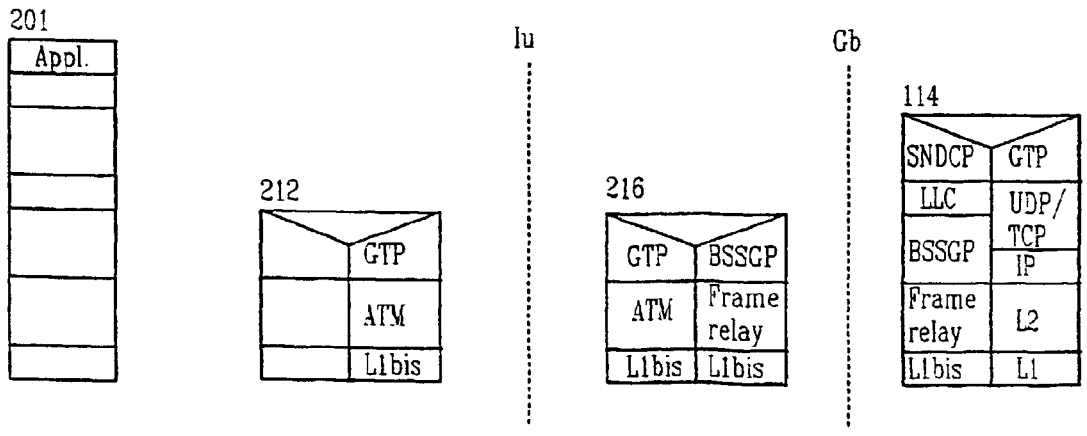
Figure 3:
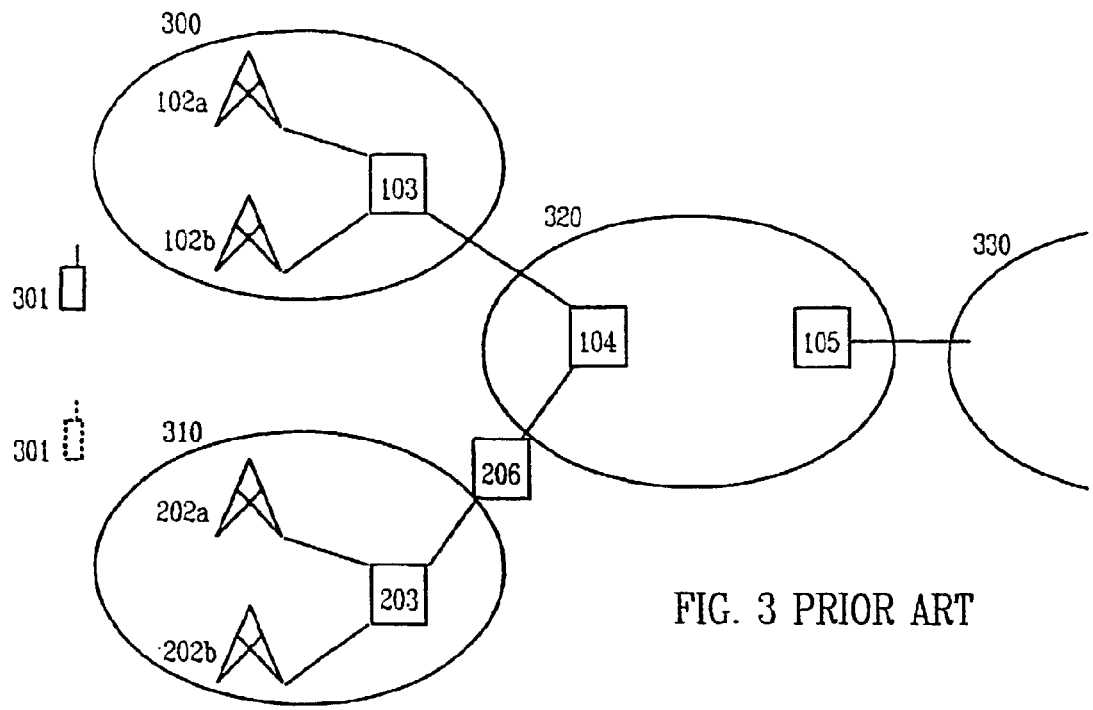
FIG. 3 shows a schematic drawing of a second generation and a third generation radio access network connected to a core packet network.
Figure 4:
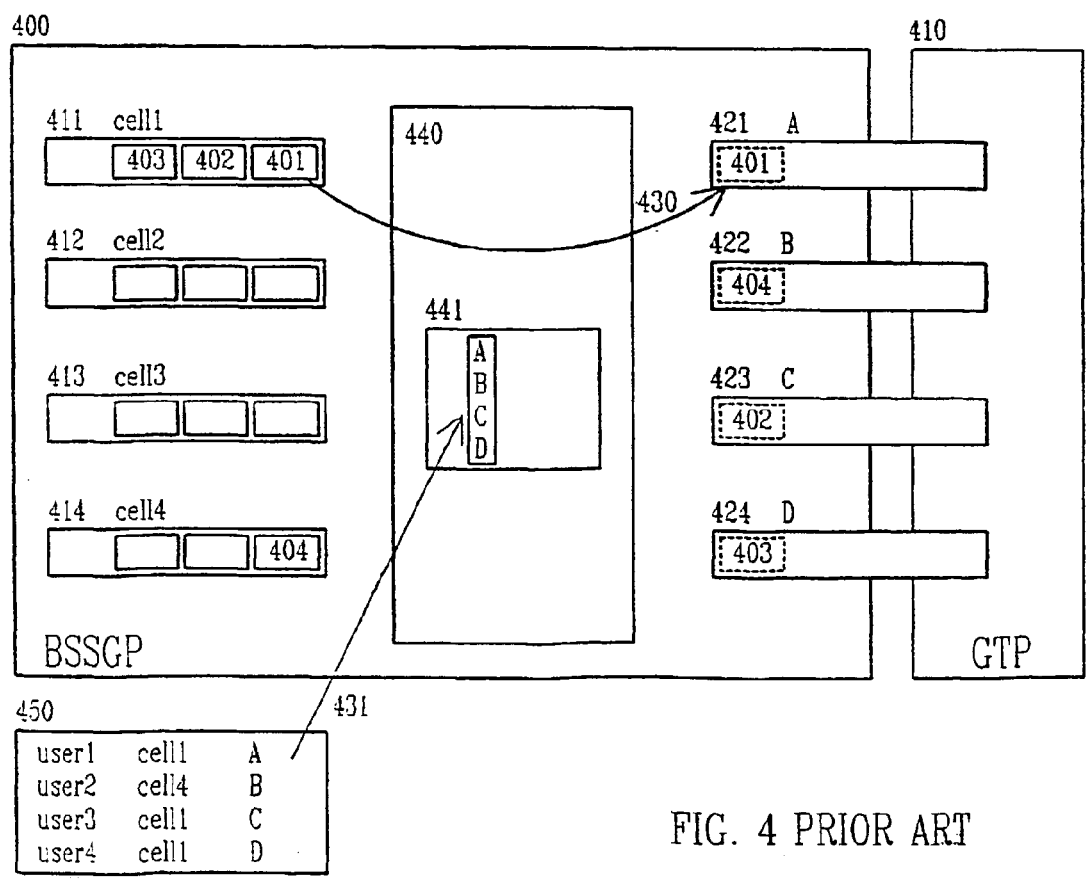
FIG. 4 shows a schematic drawing of transmission of data packets on the edge of a GPRS core network and a UMTS radio access network.
Figure 5:
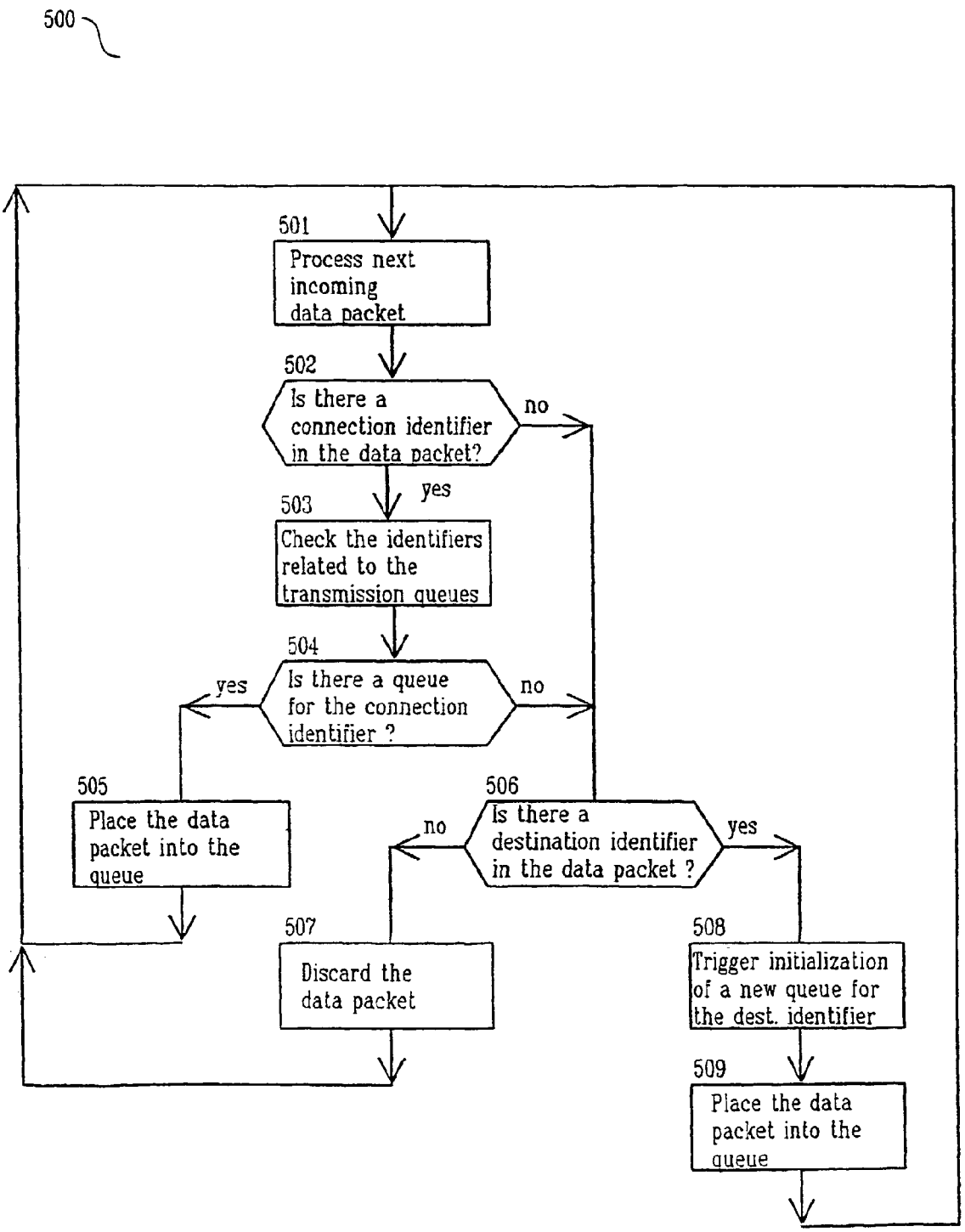
FIG. 5 shows a flowchart of a method for transmitting data packets according to a first preferred embodiment of the invention.

FIG. 5 presents a schematic drawing of a method 500 according to a first preferred embodiment of the invention. In this method, data packets are sorted to transmission queues. The sorting is done based on a connection identifier. Each data packet related to a certain connection, for example, carries a same queue identifier.

In step 501 a data packet is taken under inspection. The data packet may be, for example, an incoming data packet. In step 502 it is checked if the data packet comprises a connection identifier. If it does, then in step 503 the connection identifiers related to the transmission queues currently in use are checked. In step 504 the connection identifier in the data packet is compared to the connection identifiers related to the transmission queues. If there is a transmission queue to which the connection identifier is related, then in step 505 the data packet is placed to that transmission queue. This is the case when a certain packet data connection has been successfully established to the destination before the arrival of a data packet belonging to the packet data connection.

If the data packet comprises no connection identifier or the connection identifier is not a proper connection identifier (i.e. none of the connection identifier related to the transmission queues is equal to the connection identifier in the data packet), the data packet cannot be placed to any of the existing transmission queues. In step 506 it is checked. If the data packet comprises a destination identifier. If there is no destination identifier, it is not possible to find out where the data packet is heading, and therefore it is discarded in step 507.

If the data packet comprises a destination identifier, for example a network address or a name of the destination, then it is possible to establish a packet data connection towards the destination. In step 508 the initialization of a new transmission queue is triggered, and the initialization of the transmission queue may involve, for example, reservation of transmission resources and setting up a packet data connection. In step 509, the data packet is placed to the new transmission queue.

If the data packet that triggers the initialization of a new transmission queue does not comprise a connection identifier, the initialization process has to establish one.

After one data packet is processed, either placed to an existing or to a new transmission queue or discarded, in the method according to the first preferred embodiment of the invention the next data packet is processed similarly.

Figure 6:
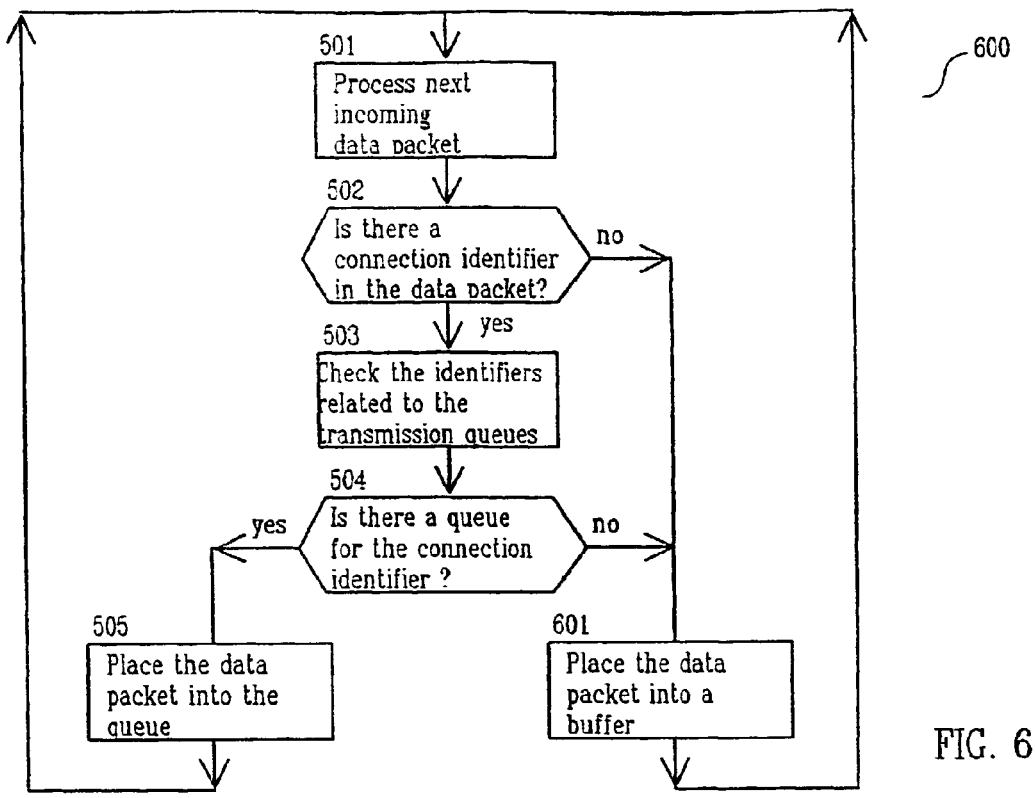
FIG. 6 shows a flowchart of a method for transmitting data packets according to a second preferred embodiment of the invention.
Figure 6:
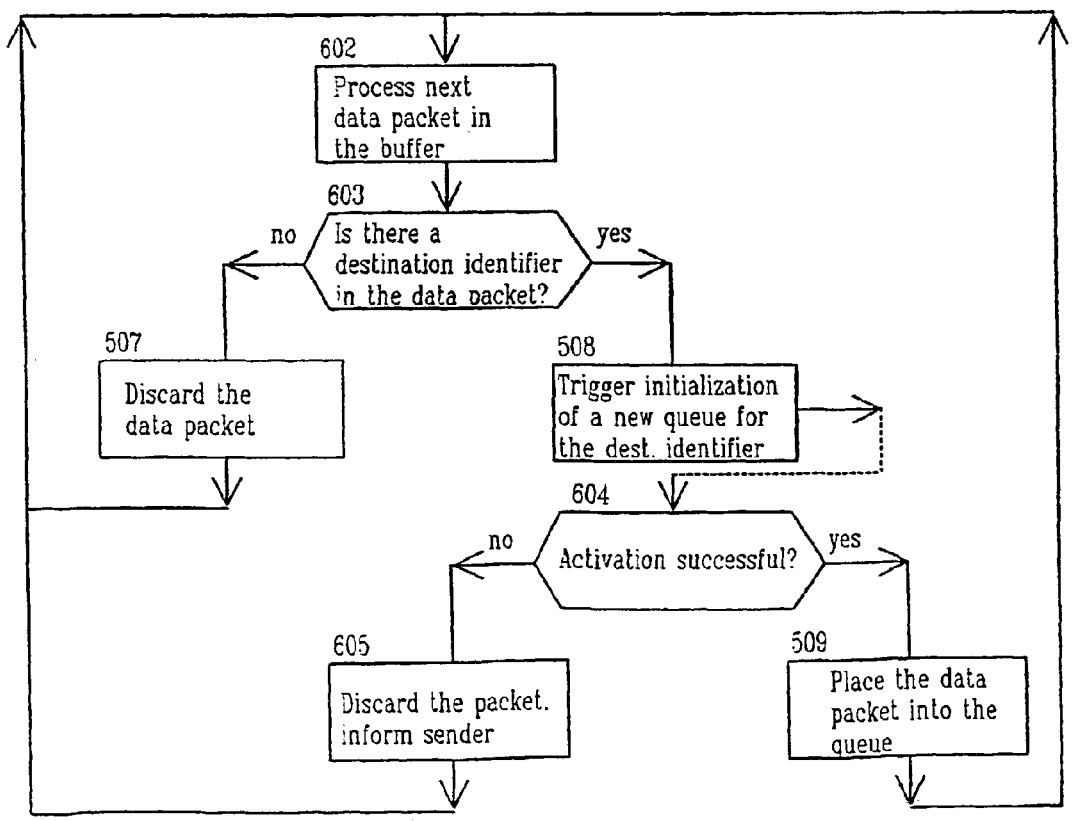

It is possible that the initialization of a transmission queue is not successful. The initialization may also take some time and during this time it is advisable to process other data packets. FIG. 6 present a flowchart of a method 600 according to a second preferred embodiment of the invention where these issues are taken into account.

The method according to the second preferred embodiment of the invention comprises two simultaneous loops. The upper part of FIG. 6 presents the loop where it is checked, if a data packet can be placed to an existing transmission queue. It comprises of steps 501–505 which are similar to the steps of the method 500 according to the first preferred embodiment of the invention. If the processed data packet comprises no connection identifier or the connection identifier is not equal to any of the connection identifiers related to the existing transmission queues, then the data packet is placed to a buffer in step 601.

The lower part of FIG. 6 presents the second loop of the method according to the second preferred embodiment of the invention. In step 602, a data packet placed to the buffer is taken under inspection. In step 506 it is checked, if there is a destination identifier in the data packet. If there is none, then the data packet is discarded in step 507 and the next data packet in the buffer is processed in step 602. If the data packet in the buffer comprises a destination identifier, in step 508 the initialization of a transmission queue is triggered. This initialization may involve, for example, reservation of transmission resources using a specific signaling protocol. After a response is attained, it is checked in step 604 if the transmission queue initialization was successful. If it was not possible to carry out the initialization procedure, then a data packet is discarded in step 604. In step 604 the sender of the data packet (or the nearest network node from where the data packet came) is informed that packets to this connection or to this destination should not be sent here. If the initialization of the new transmission queue was successful, in step 505 the data packet is placed to the new transmission queue.

Data packets related to a packet data connection between a public packet data network and a mobile station reachable through a third generation cellular system can be processed using the method according to the second preferred embodiment of the invention. This method may be implemented in the interworking unit between the GPRS core network and an UMTS radio access network.

Figure 7:
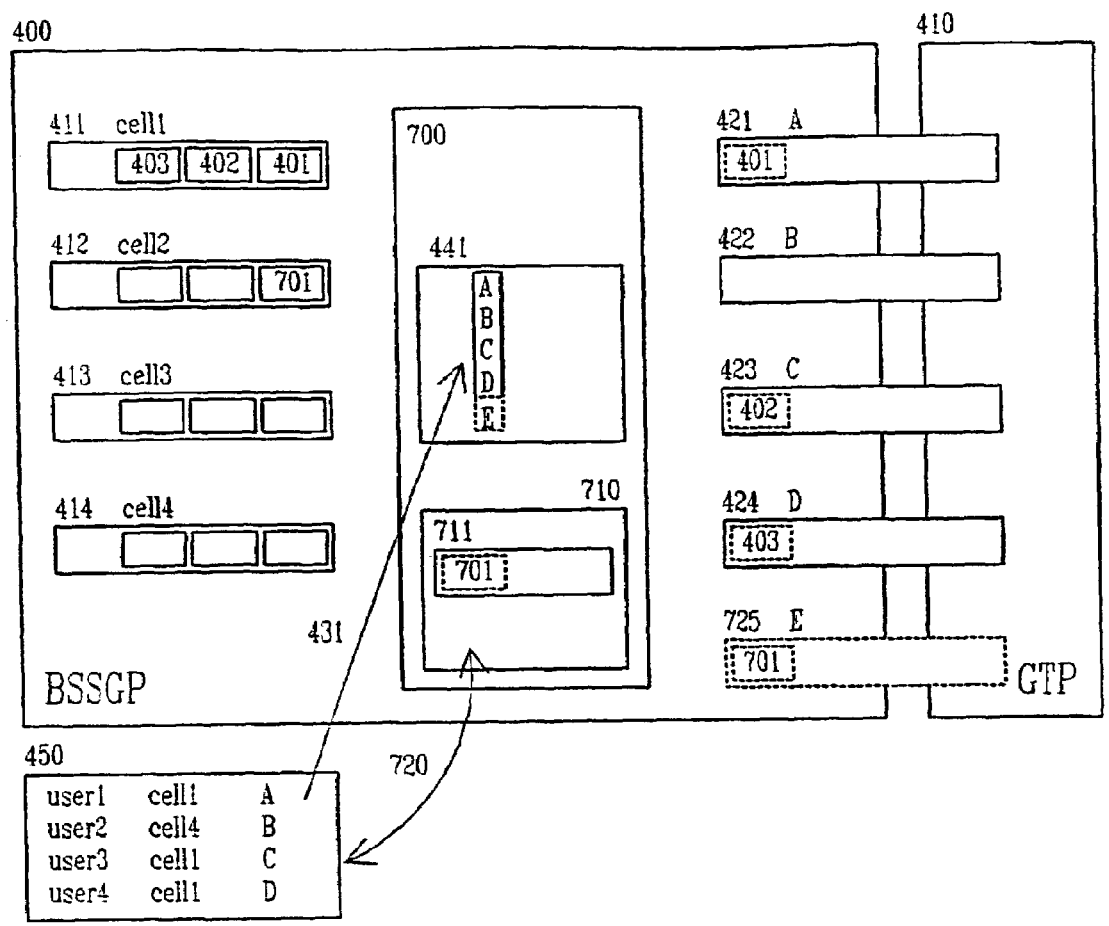
FIG. 7 shows a schematic drawing of transmission of data packets according to the invention on the edge or a GPRS core network and a UMTS radio access network.

FIG. 7 shows how a BSSGP protocol layer 400 in an interworking unit may be modified to support a method according to the invention. The modifications may be done to the switch management entity 700, for example by adding a triggering entity 710 that performs the steps of the second loop of a method according to the second preferred embodiment of the invention. The triggering entity 710 comprises a buffer 711, where those GTP data packets that no not comprise a connection identifier, for example a GTP flow label, for which there is a transmission queue. To trigger resource reservation requires signaling, this is presented in FIG. 7 with arrow 720. The signaling may be done, for example using RANAP signaling.

A data packet 701 that does not have a GTP flow label corresponding to a connection for which resources have been reserved is placed to buffer 711 (step 601 in FIG. 6). If the data packet comprises a destination identifier, for example an International Mobile Subscriber Identifier (IMSI), a Temporary Mobile Subscriber Identifier (TMSI) or a Temporary Logical Link Identifier (TLLI), this destination identifier may be signaled to the radio access network. The triggering entity 710 in the BSSGP switch management entity may, for example, sent a triggering message to the RANAP layer. The triggering message indicates the destination identifier, which is necessary in the resource reservation.

After receiving the triggering message, the RANAP layer of the interworking unit starts to reserve resources in the radio access network. For example, a BEARER_REQUEST message of the RANAP protocol may be sent to the Radio Network Controller. The RNC may answer using either a BEARER_REQUEST_COMPLETE message (resources for the packet data connection have been reserved) or a BEARER_REQUEST_FAILURE message (resource reservation was unsuccessful). After receiving the response, the RANAP layer of the interworking unit may notify the BSSGP layer of the interworking unit that resources have been reserved (step 604 in FIG. 6). Because the resources have been reserved, a transmission queue (queue 725 in FIG. 7) has been initialized in the BBSGP layer 400 and the data packet can be placed to the queue. From the; transmission queue the packet is further transmitted to the radio access network and to the right mobile station.

After reserving resources for a packet data connection, the RANAP may automatically update the subscriber database in, for example, SGSN by adding information related to the packet data connection there. It is also possible that the BSSGP layer sends information about the packet data connection to the subscriber database. The management of packet data connections in radio access network usually requires that information about the packet data connections is available in a subscriber database.

It is possible that transmission resources cannot be reserved, for example because the mobile station the destination identifier indicates is not in the cell the subscriber database indicates or because all the radio resources are already in use. In this case the triggering entity 710 may inform the SGSN that sent the data packet that the mobile station, to which the packet data connection is related, is not reachable through the RNC the SGSN expected (step 605 in FIG. 6). It may signal the information directly to the subscriber database using, for example, proprietary signaling or RANAP signaling. Thereafter the SGSN can, for example, start paging the mobile station to update the information in the subscriber database.

Certain data packets, such as GTP-U packets which carry user data, do not carry any information about the mobile station. On the other hand, GTP-C packets, which carry signaling data related to the management of the actual GTP connections, carry information about the destination mobile station, too. Therefore it is possible to place only GTP-C packets or other signaling packets to the buffer 711. Other packets, for example GTP-U packets with a flow label not corresponding to any of the transmission queues, may be discarded directly.

The re-organization of cell-specific queues to connection-specific queues as presented in FIG. 7 may be performed, for example, in the SGSN before sending the data packets to the UMTS radio access network, in an interworking unit, or in the RNC in the UMTS radio access network.

Figure 8:
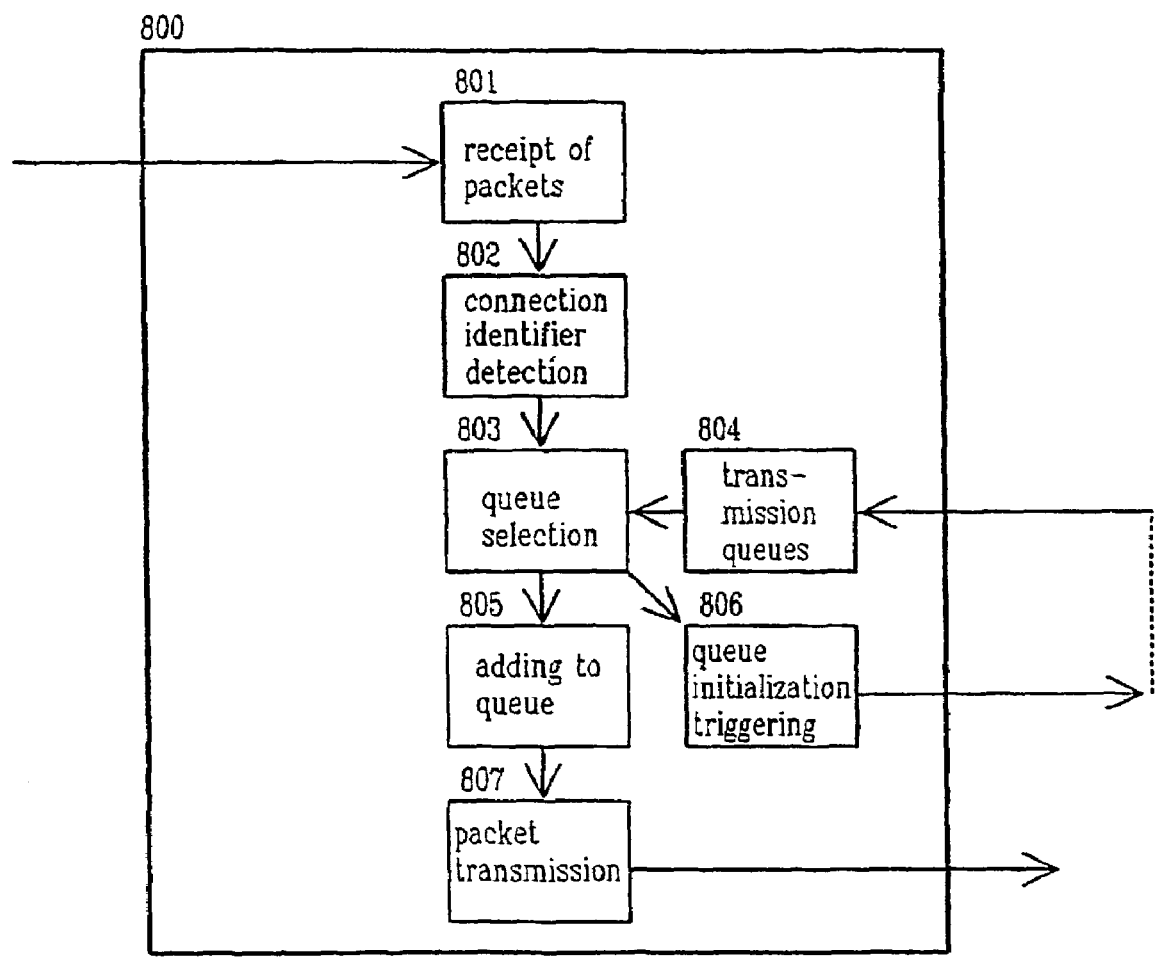
FIG. 8 shows a schematic drawing of a network element and an arrangement, where methods according to any preferred embodiment of the invention have been implemented.

FIG. 8 presents a network element 800 where a method according to the invention is implemented. The incoming data packets are received in the block 801. The connection identifier detection block 802 performs the tasks related to step 501 of the methods according to the invention. It may, for example, check if the data packet comprises a certain data field of a protocol header. The queue selection block 803 is responsible for choosing the right transmission queue for the data packet. The transmission queues block 804 comprises information about the connection identifiers for which proper resource reservations have been carried out. The adding to queue block 805 adds the data packet to the correct queue, and the queue initialization triggering block 806 is responsible, for example, for signaling related to resource reservations. From the transmission queue the data packets are transmitted further in the packet transmission block 807. The blocks may be implemented using, for example, microprocessors and suitable software.

The network element according to the invention may be, for example, a SGSN in a GPRS core network, a IWU between a GPRS core network and an UMTS radio access network or a RNC an UMTS radio access network.

The methods according to the invention are not restricted to those used only in cellular networks. It is possible to use methods according to the invention, for example, in packet data networks where transmission resources have to be reserved before transmitting data packets.

The network elements according to the invention are not restricted to network elements of cellular networks.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for transmitting data packets, comprising the steps of:
   indicating a packet data connection with a connection identifier and indicating a destination of the packet data connection with a destination identifier;
   sorting data packets into initialized transmission queues before transmission;
   involving the destination identifier in an initialization of a transmission queue;
   relating at least one connection identifier to at least one transmission queue, a set of proper connection identifiers comprises a union of the connection identifiers related to initialized transmission queues; and
   placing a data packet having a proper connection identifier to the transmission queue determined by the connection identifier;
   wherein the initialization of the new transmission queue is triggered by a data packet not having a proper connection identifier and having a destination identifier, and after successful initialization of the new transmission queue, the data packet that triggered the initialization is placed in the new transmission queue and a sender of a data packet is notified if the initialization of the new transmission queue is not successful.

2. The method of claim 1, wherein activation of the new transmission queue is triggered by the data packet not having a queue identifier.

3. The method of claim 1, wherein activation of the new transmission queue is triggered by a data packet having a queue identifier that is not a proper queue identifier.

4. The method of claim 1, wherein the connection identifier comprises a certain data field in a protocol packet header.

5. The method of claim 4, wherein the connection identifier comprises a flow label of General Packet Radio Service Tunneling Protocol header and the destination identifier comprises a certain cellular network subscriber identifier.

6. The method of claim 1, further comprising the step of:
reserving transmission resources in a radio access network when the initialization of the new transmission queue is triggered.

7. The method of claim 6, wherein transmission resources are reserved using Radio Access Network Application Part in Universal Mobile Communication System.

8. A network element, comprising:
means for storing data packet to transmission queues;
means for indicating the connections related to each transmission queue with connection identifiers;
means for detecting a connection identifier in a data packet; and
means for placing a data packet to an initialized transmission queue whose connection identifier is equal to the connection identifier in the data packet; and
means for triggering the initialization of a new transmission queue upon arrival of a data packet not having a connection identifier equal to any connection identifiers of transmission queues and having a destination identifier,
wherein a sender of a data packet is notified if the initialization of the new transmission queue is not successful.

9. The network element of claim 8, wherein the network element comprises an element of a cellular network.

10. The network element of claim 9, wherein the network element comprises an element of a Universal Mobile Telecommunication System.

11. The network element of claim 10, wherein the network element comprises a radio network controller.

12. The network element of claim 9, wherein the network element comprises an element of a General Packet Radio Service core network.

13. The network element of claim 12, wherein the network element comprises a Serving GPRS Supporting Node.

14. A network element, comprising:
a buffer for storing data packet to transmission queues;
a transmission queues block for indicating connections related to at least one transmission queue with connection identifiers;
a connection identifier detection block for detecting a connection identifier in a data packet;
an adder for placing a data packet into an initialized transmission queue having a connection identifier which is equal to the connection identifier in the data packet; and
a queue initialization triggering block for triggering the initialization of a new transmission queue upon arrival of a data packet not having a connection identifier equal to any connection identifiers of transmission queues and having a destination identifier;
wherein a sender of a data packet is notified if the initialization of the new transmission queue is not successful.

* * * * *